July 5, 1960 W. H. HOGAN 2,943,817
AIRCRAFT GROUND STEERING MECHANISM
Filed Sept. 16, 1955 3 Sheets-Sheet 1

INVENTOR.
WALTER H. HOGAN
BY
ATTORNEY

INVENTOR.
WALTER H. HOGAN
BY
ATTORNEY

INVENTOR.
WALTER H. HOGAN
BY
ATTORNEY

United States Patent Office 2,943,817
Patented July 5, 1960

2,943,817
AIRCRAFT GROUND STEERING MECHANISM

Walter H. Hogan, Olmsted Falls, Ohio, assignor to Cleveland Pneumatic Industries, Inc., a corporation of Ohio Filed Sept. 16, 1955, Ser. No. 534,664

6 Claims. (Cl. 244—50)

This invention relates generally to steering mechanisms and more particularly to a new and improved combination steering and control therefor particularly adapted for aircraft use.

It is an important object of this invention to provide a new and improved power steering mechanism incorporating a simplified control.

It is another important object of this invention to provide a new and improved power steering mechanism incorporating a fluid motor to provide the steering power in combination with a control valve for regulating the fluid motor wherein the valve senses the steering position of the fluid motor.

It is still another object of this invention to provide a fluid motor for power steering in combination with a control valve therefor wherein the movement of the fluid motor operates to close the valve when the desired amount of turning is achieved.

It is still another object of this invention to provide a steering mechanism incorporating a fluid motor wherein the fluid motor moves as a function of the amount of turning and wherein the control valve for the fluid motor is mounted on the motor so that the fluid motor motion operates to shut off the valve when the proper degree of steering is achieved.

Further objects and advantages will appear from the following description and drawings, wherein.

This invention pertains to an aircraft power steering mechanism wherein the amount of steering is automatically controlled depending upon the amount of steering required by the pilot of the aircraft. The pilot's control may be provided by connecting the control mechanism to the aircraft flight controls or provided by a separate control arm or wheel mounted in the pilot's compartment. In either case, the power steering mechanism turns the wheels of the aircraft to a degree determined by the amount of movement of the pilot's control so that if the pilot moves his control a small distance, the power steering mechanism turns the landing wheels through a small angle, and if the pilot moves his control a larger amount the steering mechanism will turn the wheels through a larger angle which is always proportional to the amount of movement of the control by the pilot. The fluid motor mechanism utilized to provide the power for the steering is similar to the structure of my copending application, Serial Number 481,609, filed January 13, 1955, now Patent No. 2,779,556 and reference should be made to that application for a clear understanding of the structural details of the fluid motor means and its connection to the landing gear or strut. The control valve utilized in this invention is of the type shown in my copending application, Serial Number 489,987, filed February 23, 1955. Here again reference should be made to this application for a detailed description of the control valve structure and its operation.

Figure 1:
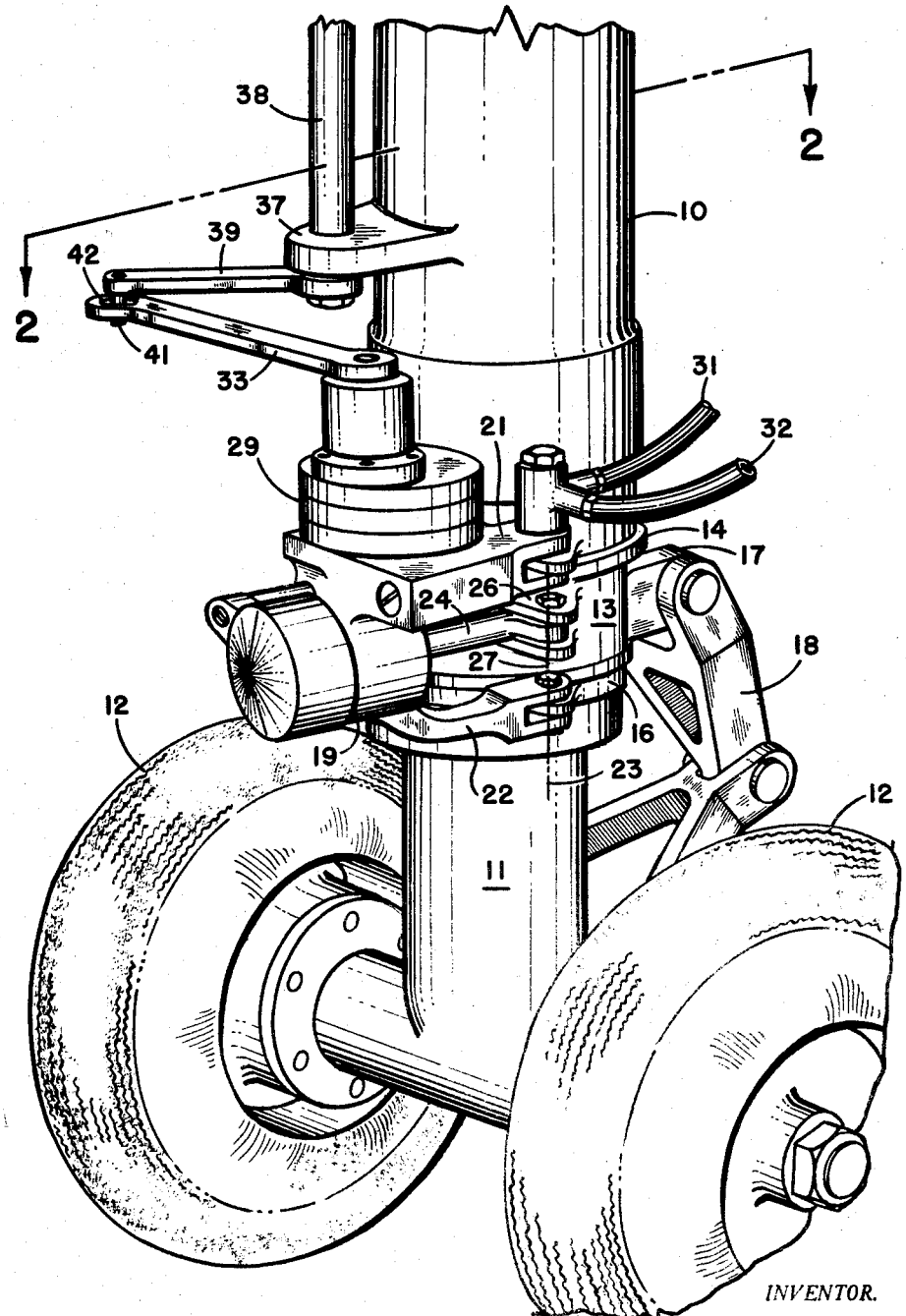
Figure 1 is a fragmentary perspective view of a landing gear incorporating a steering mechanism according to this invention.

Reference should now be made to the drawings wherein Figure 1 discloses a preferred embodiment of this invention installed to a representative landing gear. The landing gear or strut member is provided with an upper telescoping member 10 which is adapted to be mounted on the frame of an aircraft in a manner wherein it is axially and rotatably fixed relative thereto. A lower telescoping member 11 is axially movable and rotatable relative to the upper telescoping member 10 and is provided with ground engaging wheels 12 journaled thereon. A conventional oleo mechanism should be incorporated into the two telescoping members to absorb the impact of landing and support the weight of the aircraft while it is on the ground. However since the oleo forms no part of this invention it has not been shown.

The steering mechanism itself includes a steering collar 13 axially fixed and rotatable relative to the upper telescoping member 10 positioned between two stationary steering rings 14 and 16 which are mounted on the upper telescoping member 10. The steering collar 13 is provided with a pair of lugs 17 on which is mounted the upper end of torque arms 18. The torque arms are connected at their lower end to the lower telescoping member 11 and are arranged so that the lower telescoping member 11 is rotationally fixed and axially movable relative to the steering collar 13.

A fluid cylinder 19 is formed with mounting arms 21 and 22 which are pivotally connected to the rings 14 and 16 respectively for rotational movement in a horizontal plane around a pivot axis 23. A fluid actuated piston is positioned within the cylinder 19 and is provided with a piston rod 24 which is pivotally connected to lugs 26 formed on the steering collar 13 for rotation relative thereto about a pivot axis 27. The various elements are proportioned so that the pivot axes 23 and 27 are parallel to and equally spaced from the central axis 28 of the strut so when the piston rod 24 moves axially relative to the cylinder 19 and causes the steering collar 13 to rotate about the central axis 28, the cylinder 19 rotates around the axis 23 through an angle equal to one-half of the angle of turning of the steering collar 13. Thus the angular position of the cylinder 19 relative to the upper telescoping member 10 is a function of the angular position of the steering collar 13 relative to the upper telescoping member 10. This movement is described in detail in the copending application Serial Number 481,609 cited above.

A control valve 29 is mounted on the cylinder 19 and is arranged to control the fluid flow to and from the cylinder and thus control the operation of the steering mechanism. Hydraulic lines 31 and 32 are connected to a source of pressure fluid and a reservoir return respectively and to the cylinder 19 through the control valve 29. Thus if the control valve 29 is positioned to supply fluid under pressure to the outer end of the cylinder 19, a force is developed on the piston rod 24 urging it forward relative to the cylinder which in turn rotates the steering collar 13 to the left. Conversely if the control valve is operated to supply fluid under pressure to the inner end of the cylinder 19, a rearward force is developed in the piston rod 24 which turns the steering collar 13 to the right.

Figure 2:
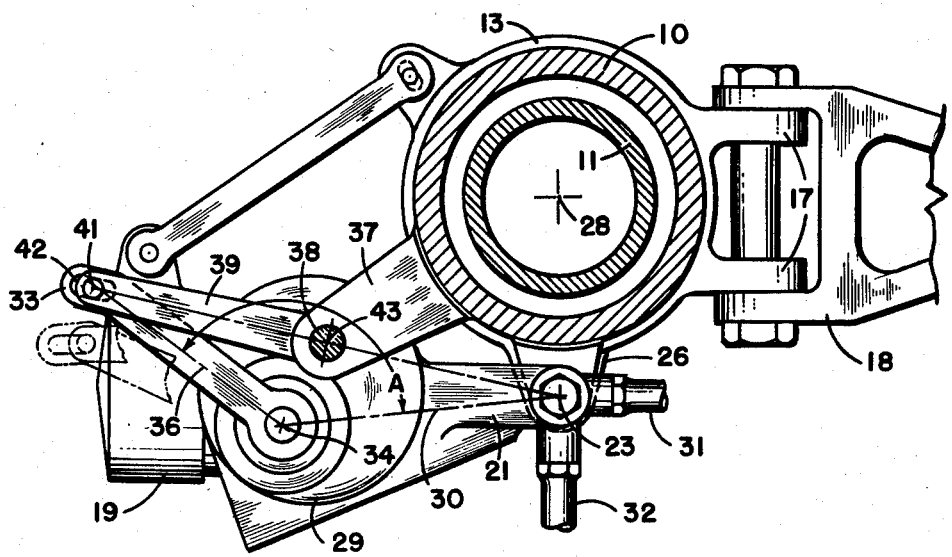
Figure 2 is a plan view taken along 2—2 of Figure 1 showing the position of the elements when the steering mechanism is in the neutral position which is the position wherein the wheels are aligned with the axis of the aircraft.

The control valve 29 is provided with an operating arm 33 arranged so that when it is in the neutral position shown in Figure 2, the control valve isolates the cylinder 19 from the hydraulic line 31. However if the operating arm is rotated in a counter clockwise direction relative to the control valve from the position shown in Figure 2 to the position shown in phantom, the hydraulic line 31 is connected to the outer end of the cylinder 19 thus causing steering to the left toward the position shown in Figure 3. Conversely if the operating arm 33 is rotated in a clockwise direction, the hydraulic line 31 is connected to the inner end of the cylinder 19 which causes steering to the right. When the control valve is in the neutral position at which time the hydraulic line 31 is isolated from the cylinder 19, an angle A is formed at the intersection of a line 30 connecting the pivot axis 26 with the pivot axis 34 of the operating arm 33 with the longitudinal axis 36 of the operating arm 33.

The upper telescoping member 10 is also formed with a lug 37 on which is supported the lower end of a control rod 38 which is connected to the steering control mechanism of the pilot's compartment of the aircraft. A direct connection should be utilized so that rotation of the control rod 38 is directly proportional to the movement of the control mechanism within the pilot's compartment. The particular structure for this connection has not been shown, but the control rod 38 could be connected to the flight controls or to a separate control depending upon the particular needs of the aircraft installation.

Mounted on the lower end of the control rod 38 is a laterally projecting lever 39 formed with a depending pin 41 which projects through a slot 42 formed in the operating arm 33. The slot 42 is arranged so that it extends along a line through the pivot axis 23 of the cylinder when the operating arm 33 is in the neutral position. This is best illustrated in Figure 2. It is also preferable to arrange the elements so that the line of the slot 42 extending through the axis 23 also passes through the axis 43 of the control rod 38 when the steering is in the neutral position. This provides a symmetrical arrangement and permits the use of a slot 42 having a minimum length for any given design. The distance between the axis 23 and the axis 43 is equal to the distance between the axis 43 and the center of the pin 41. This relationship is particularly important since the cylinder 19 rotates through an angle equal to one-half of the angle of rotation of the steering collar 13 when the mechanism operates. However, because the pin 41 is spaced from the axis 43 a distance equal to the spacing between the axis 43 and 23, the lever 39 rotates through an angle equal to twice the angle of rotation of the cylinder 19 when the mechanism is operated. Therefore the lever 33 rotates through the same angle as the steering collar 13.

Figure 3:
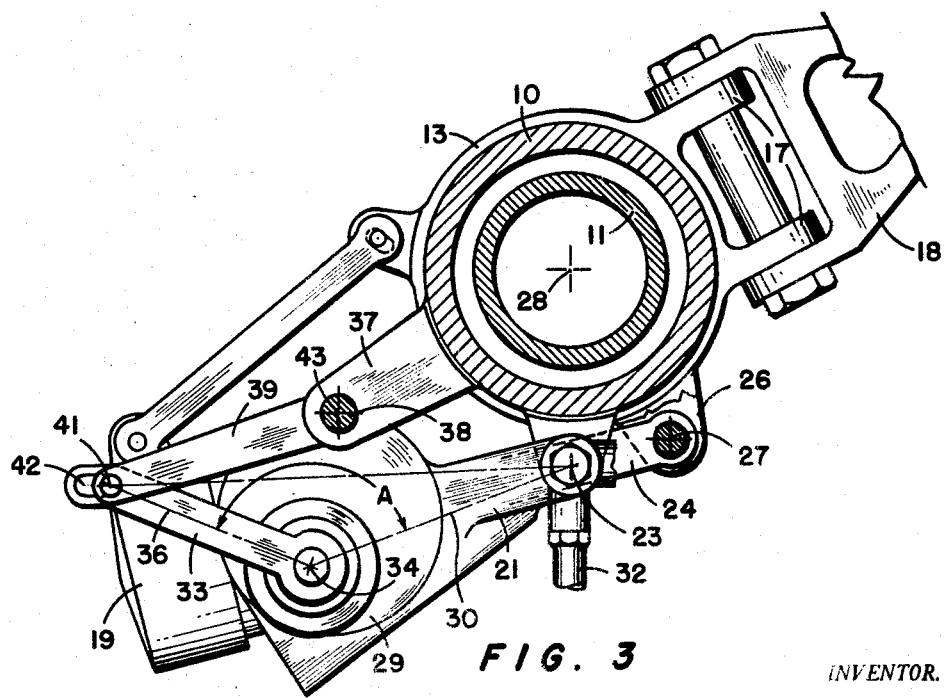
Figure 3 is a view similar to Figure 2 showing the position of the elements in the extreme position of steering to the left.
Figure 4:
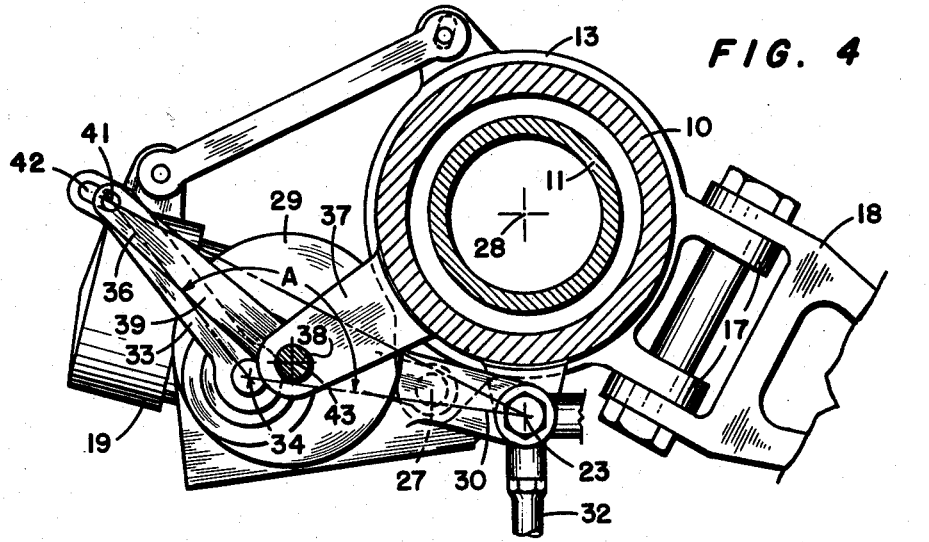
Figure 4 is a view similar to Figure 2 showing the position of the elements in the extreme position of steering to the right.

In operation if it is desired to turn the wheels 12 to the left, the control rod 38 is rotated in a counter clockwise direction and through the connection of the lever 39 and the pin 41, the operating arm 33 is moved in a counter clockwise direction to the position shown in phantom in Figure 2. The valve is opened in this position and the hydraulic line 31 is connected to the rearward end of the cylinder 19. Therefore a force is produced on the piston rod 24 which rotates the steering collar 13 is a counter clockwise direction. This in turn causes the cylinder 19 to rotate around the axis 23 in a counter clockwise direction through an angle equal to one-half of the turning angle of the steering collar 13. Since the valve 29 is mounted on the cylinder 19 it rotates therewith and moves relative to the lever 39 until the control arm 33 returns to its neutral position at which time the angle A is defined by the longitudinal axis 36 and the line 30. As soon as this relationship is achieved, the valve is automatically closed and there is no further rotation. When this occurs the steering collar 13 will have turned through the same angle as the control rod 38 and the lever 39 so the amount of turning of the steering collar 13 is not only directly proportional to the amount of turning of the control rod 38 but also is equal thereto. In Figure 3 the elements are shown in the extreme position of steering to the left and when the elements are in this position the lever 39 has rotated from its initial position through an angle equal to the rotation of the steering collar 13 from its initial position. Those skilled in the art will recognize that rotation of the lever 39 by the control rod 38 to any desired angle will cause the power steering mechanism to automatically turn the steering collar 13 through the same angle and as soon as this angular relationship is achieved, the power steering mechanism will automatically shut off. Therefore a very simple follow up or servo mechanism is provided to control the steering mechanism.

Figure 5:
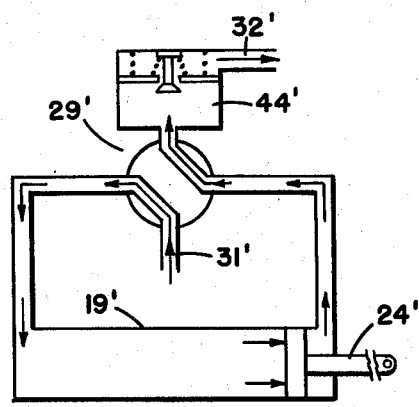
Figure 5 is a schematic view of the control valve and fluid motor showing the operation when the fluid motor is operating to steer to the left.
Figure 6:
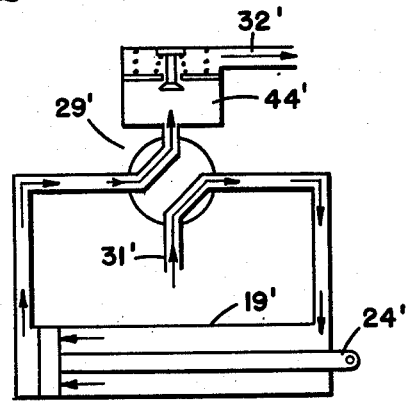
Figure 6 is a view similar to Figure 5 showing the operation when power steering to the right; and, Figure 7 is a schematic view showing the hydraulic circuit when the power steering is not operating.
Figure 7:
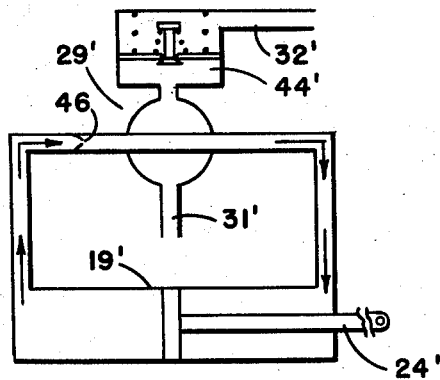

In Figures 5 to 7 the steering mechanism is shown schematically so a prime (') has been added to the reference numerals but similar numbers correspond to all the figures. Figure 5 shows a schematic view of the fluid circuit when the control arm 33 is rotated in a counter clockwise direction at which time the source of fluid pressure is connected through the hydraulic line 31' to the outer end of cylinder 19' and the piston rod 24' moves to the right at which time the inner end of the cylinder 19' is connected to the reservoir return through the hydraulic line 32'. I prefer to provide an accumulator 44' integrally formed in the cylinder structure to accommodate variations in the volume of the hydraulic fluid caused by temperature changes and the like. In Figure 6 the hydraulic circuit is shown wherein the control arm 33 is turned in a clockwise direction from the neutral position at which time the forward end of the cylinder 19' is supplied with fluid under pressure causing movement of the piston rod 24' to the left. In Figure 7 the neutral position is shown wherein the cylinder 19' is isolated from the source of pressure fluid and no steering takes place. In the preferred embodiment a dampening orifice 46 is introduced into the hydraulic circuit when the two ends of the cylinder 19' are connected so that shimmy will be controlled.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An aircraft steering mechanism comprising a first member and a second member rotatable relative to said first member, fluid actuated piston and cylinder elements capable of relative axial motion wherein one of said elements is pivotally connected to said first member and the other is pivotally connected to said second member whereby relative axial motion between said elements produces relative rotary motion between said members and relative rotation between said one element and said first member, a valve mounted on the said one element connected between said elements and a source of fluid pressure operable to control fluid flow to said elements and thereby control said relative axial motion, an operator mounted on said first member rotatable relative thereto, connected means between said valve and operator operable to open said valve and connect said elements to said source in response to rotation of said operator and close said valve in response to movement of said valve with said one element.

2. An aircraft steering mechanism comprising first and second members rotatable relative to each other around a first axis, a cylinder element pivotally connected to said first member for rotation relative thereto about a second axis, a cooperating fluid actuated piston pivotally connected to said second member for rotation relative thereto about a third axis whereby relative axial motion between said elements produces relative rotation between said members and rotation of said elements around their respective pivots, said second and third axes being parallel and equally spaced from said first axis, a valve mounted on one of said elements operable to control flow of pressure fluid to said elements and thereby control said axial motion, an operating rod mounted on said first member for rotation relative thereto about a fourth axis, operating means between said operating rod and valve operable to open said valve and produce said axial motion in response to rotation of said operating rod relative to said first member and automatically close said valve in response to rotation of said one element around its pivot upon relative rotation between said members through an angle equal to the angle of relative rotation between said operating rod and first member.

3. An aircraft steering mechanism comprising a first member and a second member rotatable relative to said first member around a first axis, a cylinder element pivotally connected to said first member for rotation relative thereto about a second axis, a cooperating fluid actuated piston pivotally connected to said second member for rotation relative thereto about a third axis whereby relative axial motion between said elements produces relative rotation between said members and rotation of said elements around their respective pivots, a valve mounted on said cylinder element operable to control flow of pressure fluid to said elements and thereby control said axial motion, an operating rod mounted on said first member for rotation relative thereto about a fourth axis parallel to and spaced from the other axes, operating means between said operating rod and valve operable to open said valve and produce said axial motion upon rotation of said operating rod relative to said first member and automatically close said valve in response to rotation of said cylinder element around its pivot and movement of said valve relative to said fourth axis wherein the relative movement between said members is a constant function of the relative movement between said operating rod and said first member.

4. An aircraft steering mechanism comprising a first member and a second member rotatable relative to said first member and around a first axis, cooperating piston and cylinder elements one pivotally connected to said first member for rotation relative thereto about a second axis and the other pivotally connected to said second member for rotation relative thereto about a third axis whereby relative axial motion between said elements produces relative rotation between said members and rotation of said elements around their respective pivots, said second and third axes being parallel to and equally spaced from said first axis, a valve mounted on said one element operable to control flow of pressure fluid to said elements and thereby control said axial motion, a valve arm movable to operate said valve, an operating rod mounted on said first member for rotation relative thereto about a fourth axis, an operating lever mounted on said operating rod, connecting means between said operating lever and valve arm moving said valve arm in response to rotary motion of said operating lever, the distance between said second axis and fourth axis being equal to the effective length of said operating lever.

5. An aircraft steering mechanism comprising a first member and a second member rotatable relative to said first member around a first axis, a cylinder element pivotally connected to said first member for rotation relative thereto about a second axis, a cooperating fluid actuated piston element pivotally connected to said second member for rotation relative thereto about a third axis whereby relative axial motion between said elements produces relative rotation between said members and rotation of said elements around their respective pivots, said second and third axes being parallel to and equally spaced from said first axis, a valve mounted on said cylinder element operable to control flow of pressure fluid to said elements and thereby control said axial motion, a valve arm on said valve movable to operate said valve, an operating rod mounted on said first member for rotation relative thereto about a fourth axis, an operating lever mounted on said operating rod, connecting means between said operating lever and valve arm moving said valve arm in response to rotary motion of said operating lever, the distance between said second axis and fourth axis being equal to the effective length of said operating lever.

6. An aircraft steering mechanism comprising a first member and a second member rotatable relative to said first member around a first axis, a cylinder element pivotally connected to said first member for rotation relative thereto about a second axis, a cooperating fluid actuated piston element pivotally connected to said second member for rotation relative thereto about a third axis whereby relative axial motion between said elements produces relative rotation between said members and rotation of said elements around their respective pivots, said second and third axes being parallel to and equally spaced from said first axis, a valve mounted on said cylinder operable to control flow of pressure fluid to said elements and thereby control said axial motion, a valve arm on said valve movable from a first position wherein said valve prevents flow of pressure fluid to said elements to positions spaced therefrom wherein pressure fluid is permitted to flow to said elements and produces said axial motion, said valve arm being formed with an elongated slot aligned with said second axis when said valve is in said first position, an operating rod mounted on said first member for rotation relative thereto about a fourth axis, an operating lever mounted on said operating rod formed with a pin extending into said slot engaging the lateral walls thereof whereby rotary motion of said operating lever moves said valve arm, the distance between said second axis and fourth axis being equal to the distance between said pin and said fourth axis.

References Cited in the file of this patent

UNITED STATES PATENTS

| | | |
|---|---|---|
| 2,424,233 | Greenough | July 22, 1947 |
| 2,508,057 | Bishop | May 16, 1950 |
| 2,543,233 | Dowty | Feb. 27, 1951 |
| 2,650,782 | Fehring | Sept. 1, 1953 |
| 2,779,556 | Hogan | Jan. 29, 1957 |